Patented Mar. 21, 1933

1,902,803

UNITED STATES PATENT OFFICE

HARRY HOPKINSON AND JOHN GUY BRITTON, OF LANSDOWNE, PENNSYLVANIA, ASSIGNORS OF ONE-THIRD TO TUDOR R. WILLIAMS, OF SCRANTON, PENNSYLVANIA

PLASTIC COMPOSITION

No Drawing.   Application filed May 2, 1931. Serial No. 534,699.

The purpose and effect of our invention is to provide a composition which is principally inflammable cellulosic material, for instance, an aggregate of vegetable fibers, particularly fibers of sugar cane; but which is rendered flameproof by the inclusion therein of a residue of aqueous solutions including a metallic phosphate dissolved in a slight excess of phosphoric acid, and an alkali which neutralizes the excess of phosphoric acid and produces an insoluble salt in the composition.

Our invention includes the various novel features of compositions and methods of making the same hereinafter more definitely specified.

For example: We may make an aggregate of fibers of sugar cane of any desired form, for instance a plane sheet, by saturating said fibers in water, compressing the same, and thereafter dessicating it. Such dessication facilitates the introduction to the porous mass of cellulosic material thus formed of material by which it is rendered fireproof.

Such fireproofing material may be prepared by dissolving one part of zinc oxide and two parts of zinc chloride in four parts of ammonium hydroxide containing one fourth part of ammonium chloride. Then slowly adding phosphoric acid to that solution until a precipitate is first formed therein and then redissolved by the addition of phosphoric acid. Thereafter, water may be added to the solution aforesaid until it is diluted to the desired strength which is determinable with reference to the minimum cost of the materials to produce the desired fireproofing effect. We have found that such a solution diluted until it includes twenty-four parts of water is adequate for inclusion in such an aggregate of cane fibers, which is then saturated with such dilute solution. Thereafter, the saturated aggregate of said cellulosic material may be dessicated to eliminate substantially all of the water therefrom, leaving the residue of the fireproofing chemicals aforesaid therein, and then said aggregate may be immersed in a bath of water which has been rendered slightly alkaline by the addition of ammonium hydroxide, or said aggregate may be immersed in such alkaline bath without the preliminary drying step aforesaid. In either case, the effect of the alkali in the latter bath is to neutralize the excess of phosphoric acid and produce an insoluble salt in the aggregate of cellulosic material so that the latter is substantially waterproof, in the sense that the fireproofing materials cannot be leached therefrom by subsequently subjecting said aggregate to the action of water.

We find it desirable if the cellulosic material of the aggregate to be rendered fireproof is cotton, to treat it as above contemplated with reference to the aggregate of cane fibers, except that the first fireproofing solution is not diluted to the same degree, it being desirable to dilute such solution for treatment of cotton only until it contains, say, but twelve parts of water.

However, we prefer to use other alkali than ammonium hydroxide in the treatment of cellulosic material in the nature of cotton, for instance, equivalent amounts of caustic soda or sodium carbonate may be substituted for the ammonia to secure the same degree of alkalinity.

Moreover, the process above described may be simplified by substituting for the step of immersing the cellulosic aggregate in a separate aqueous solution of ammonia; immersion of the aggregate in the first solution after the latter has been diluted by the addition of water to the desired extent.

In either case aforesaid, after the reaction by which the insoluble salt is formed, the cellulosic aggregate may be removed from the liquid and dried.

Another method of obtaining the result aforesaid is to dissolve zinc oxide and zinc chloride, or magnesium oxide and magnesium chloride, in phosphoric acid. Precipitate that solution by addition of ammonium hydroxide, and redissolve the precipitate by addition of an excess of ammonium hydroxide. The cellulosic material to be fireproofed is then saturated in that solution until an insoluble salt is formed therein, after which the excess ammonia is driven off by heat or other means.

However, the material to be fireproofed may be saturated in said solution of zinc oxide and zinc chloride, or magnesium oxide and magnesium chloride, dissolved in phosphoric acid, and thereafter immersed in a second bath containing ammonia or other alkali capable of neutralizing the excess phosphoric acid as aforesaid and, when that reaction has occurred, the material may be removed and dried.

It is to be understood that our invention is not limited to the treatment of aggregates of felted cellulosic material such as above contemplated but textile materials such as cotton canvas or other textile fabrics may be thus rendered substantially fireproof and waterproof for use as awnings, tarpaulins, etc. Moreover, wrapped or braided insulation of electric wiring formed of silk, cotton, or other fibers may be rendered substantially fireproof and waterproof by treatment with any of the fireproofing solutions aforesaid.

Therefore, we do not desire to limit ourselves to the precise details of the methods or means for fireproofing above set forth or to the specific ingredients of the plastic compositions produced thereby as herein set forth, as it is obvious that various modifications may be made therein without departing from the essential features of our invention, as defined in the appended claims.

We claim:

1. A method of forming a substantially fireproof plastic composition which is principally porous cellulosic material which is normally inflammable; which consists in impregnating such cellulosic material with a dilute solution of a metallic phosphate containing excess or free acid, and forming an insoluble salt in said material by neutralizing said excess or free acid with an alkaline substance.

2. A method as in claim 1, wherein the cellulosic material is an aggregate of vegetable fibers.

3. A method as in claim 1, wherein the cellulosic material is a felted aggregate of cane fibers.

4. A method as in claim 1, wherein the metallic phosphate includes a metallic oxide and a metallic chloride.

5. A method as in claim 1, wherein the phosphate includes both an oxide and a chloride of the same metal.

6. A method as in claim 1, wherein the phosphate includes zinc oxide and zinc chloride and an ammonium salt.

7. A method as in claim 1, wherein the phosphate includes both ammonium hydroxide and chloride.

8. The method of forming a substantially fireproof and waterproof composition which is principally porous cellulosic material which is normally inflammable; which consists in first saturating said cellulosic material in an aqueous solution containing zinc oxide and zinc chloride, ammonium hydroxide and ammonium chloride and phosphoric acid; and forming an insoluble salt including the residue of said chemicals.

9. A method as in claim 8, wherein one part of zinc oxide and two parts of zinc chloride are dissolved in four parts of ammonium hydroxide containing one fourth part of ammonium chloride, and the phosphoric acid is slowly added to said solution until a precipitate is first formed in the latter and then redissolved by the addition of said phosphoric acid, forming an acid phosphate; which acid phosphate is thereafter neutralized in the formation of an insoluble salt.

10. A method as in claim 1, wherein the cellulosic material is dried after being impregnated with the phosphate and before the latter is neutralized.

11. A method as in claim 1, wherein the alkaline neutralizing chemical is applied to the cellulosic material in a bath distinct from the bath containing the other chemicals.

12. The method of forming a substantially fireproof and waterproof composition which is principally porous cellulosic material which is normally inflammable; which consists in subjecting said cellulosic material to the combined action of zinc oxid, zinc chlorid, ammonium chlorid, and phosphoric acid, and an alkali in such proportions that the residue of said chemicals is an insoluble neutral salt.

13. The method of forming a substantially fireproof and waterproof composition which is principally porous cellulosic material which is normally inflammable; which consists in subjecting said cellulosic material to the combined action of an oxid and chlorid of the same metal in the presence of phosphoric acid and an alkali in such proportions as to form an insoluble neutral salt including the residue of said chemicals.

In testimony whereof, we have hereunto signed our names at Philadelphia, Pennsylvania, this first day of May, 1931.

HARRY HOPKINSON.
JOHN GUY BRITTON.